United States Patent Office 3,420,835
Patented Jan. 7, 1969

3,420,835
3-PHENYL-7-AMINO-CARBOSTYRILS AS BRIGHTENING AGENTS
Wolf-Dieter Wirth, Cologne-Stammheim, Hans Knupfer, Bergisch Neukirchen, Carl-Wolfgang Schellhammer, Opladen, Karl Schonol, Leverkusen, and Walter Scholermann, Cologne, Germany, assignors to Farbenfabriken Bayer Aktiengesellschaft, Leverkusen, Germany, a corporation of Germany
No Drawing. Filed Mar. 24, 1966, Ser. No. 537,030
Claims priority, application Germany, Mar. 30, 1965,
F 451,669
U.S. Cl. 260—288      8 Claims
Int. Cl. C07d 33/52

ABSTRACT OF THE DISCLOSURE 3-phenyl-7-amino-carbostyrils having utility as brighteners.

---

The present invention relates to brightening agents; more particularly it concerns brightening agents which contain as active component 3-phenyl-7-amino-carbostyril compounds of the formula

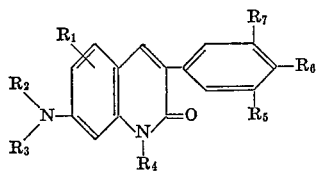

In this formula $R_1$, $R_2$, $R_3$ and $R_4$, independently of each other, stand for hydrogen atoms or for lower alkyl groups such as methyl or ethyl or other linear alkyls, whilst $R_5$, $R_6$ and $R_7$, independently of each other, mean hydrogen atoms, alkyl groups such as methyl and ethyl, alkoxy groups such as methoxy and ethoxy, or halogen atoms such as chlorine or bromine.

The brightening agents of the present invention are suitable for the brightening of the most varied materials, mainly for the brightening of fibres, threads, woven and knitted fabrics or foils of synthetic origin, especially for the brightening of materials of polyvinyl chloride and polyamides, moreover for the brightening of soaps and also of lacquers, particularly of lacquers based on nitrocellulose or cellulose acetate.

The brightening agents can be employed in the usual manner, for example, in the form of aqueous dispersions or in the form of solutions in inert organic solvents; if desired the brightening agents may also be used in combination with detergents or added to casting masses which serve for the production of foils or threads. The quantities of brightening agent required in each case can easily be determined by preliminary experiments; in general, quantities of 0.1–1% of brightening agent, referred to the weight of the material to be treated, will suffice.

The compounds to be used according to the invention as brightening agents can be obtained, for example, by condensing 2-amino-4-nitrotoluenes of the formula

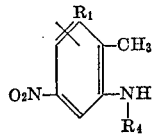

with phenylglyoxylic acid ethyl esters of the formula

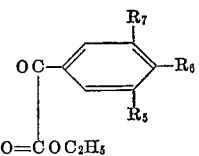

to give 3-phenyl-7-nitrocarbostyrils of the formula

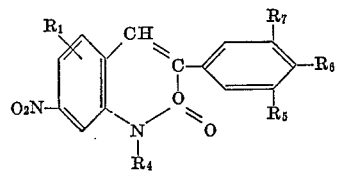

reducing the nitro group to the amino group and optionally alkylating the latter. In these formulae, $R_1$ and $R_4$ to $R_7$ have the same meaning as above.

The following examples serve to illustrate the invention without, however, limiting its scope; the parts given are parts by weight.

Example 1

65 parts polyvinyl chloride with a K-value of 72–74, 35 prats dioctyl phthalate, 2 parts of a commercial organic tin compound used for stabilising the polyvinyl chloride, 1 part titanium dioxide rutile and 0.1 part 1-ethyl-3-phenyl-7-dimethylamino-carbostyril as brightening agent are rolled on a hot roller with low friction at about 165–170° C. for 5 minutes. The rough sheet obtained is then worked on a four roll calender to a foil of about 300μ thickness. The foil is excellently brightened.

The brightening agent used was prepared in the following manner:

17.9 parts 2-ethylamino-4-nitrotoluene, 16.2 parts phenylglyoxylic acid ethel ester and 2 parts piperidine were heated, whilst stirring, at 200° C. for 8 hours. 18 parts of the 1-ethyl-3-phenyl-7-nitro-carbostyril thus obtained were then heated on a water bath in a mixture of 50 parts alcohol and 50 parts concentrated hydrochloric acid and treated, whilst stirring, with a solution of 50 parts tin-II-chloride in 100 parts concentrated hydrochloric acid. The reaction mixture was stirred for a further hour and then cooled. The precipitated 1-ethyl-3-phenyl-7-amino-carbostyril was filtered off, briefly boiled with 200 parts 5% sodium hydroxide solution, then filtered off while hot, dried and recrystallised from xylene. 13.2 parts of the 1-ethyl-3-phenyl-7-amino-carbostyril of melting point 170–172° C. thus obtained, were dissolved in 150 parts dioxan, treated with 25 parts of an about 35% methanolic formaldehyde solution and with 10 parts of Raney nickel catalyst and then heated in an autoclave under a hydrogen pressure of 110 atmospheres for 4 hours at 110° C. The Raney nickel catalyst was then removed and the dioxan distilled off under vacuum. After recrystallisation from cyclohexane, the remaining 1-ethyl-3-phenyl-7-dimethylamino-carbostyril had a melting point of 109–112° C.

Example 2

Laundry goods of cellulose acetate or synthetic polyamides which have a yellowish look are washed in the customary manner with a detergent which contains 0.2% 1 - ethyl-3-phenyl-7-dimethylamino - carbostyril, besides about 20% of synthetic washing-active substances and complex phosphates, sodium silicate, carboxymethyl cellulose and sodium perborate. The goods then have a radiant white look.

Example 3

Laundry goods of wool are washed in the usual manner with a detergent suitable for fine laundering, which contains 0.1% 1-ethyl-3-phenyl-7-dimethylamino-carbostyril. The goods treated show thereafter a pure white look.

Example 4

Textiles of cellulose acetate, wool or synthetic polyamides which have a yellowish-white look are treated for 30 minutes at 50–60° C. with an aqueous solution which contains per litre 3 g. sodium dithionite, 1.5 g. tetrasodium pyrophosphate and 0.05 g. 1-ethyl-3-phenyl-7-dimethylamino-carbostyril. The textiles thus treated are then pure white.

Textiles of polyacrylonitrile fibres can be brightened in the same manner if the treatment with the solution specified above is carried out at 80–100° C.

Example 5

20 grams 1-ethyl-3-phenyl-7-dimethylamino-carbostyril are incorporated into 100 kg. hard soap, toilet soap, needle soap or soap flakes. The carbostyril is employed for this purpose in the form of an aqueous suspension or in the form of a soap solution. The initially yellowish-coloured soaps thereby obtain a radiant white look.

If laundry goods of cellulose acetate, wool or synthetic polyamides are washed with such soaps, they are likewise brightened.

Instead of 1-ethyl-3-phenyl-7-dimethylamino-carbostyril applied in the Examples 1–5 as brightening agent, it is also possible to use 3-phenyl-7-dimethylamino-carbostyril of melting point 258–262° C., 1-methyl-3-phenyl-7-aminocarbostyril of melting point 190–192° C., 1-methyl-3-phenyl-7-dimethylamino-carbostyril of melting point 170–173° C., 1-methyl-3-(4′-methylphenyl)-7-dimethylamino-carbostyril of melting point 185–190 C., 1-methyl-3-(4′-methylphenyl)-6-methyl-7-dimethylamino - carbostyril of melting point 152–153° C., 1-methyl-3-(3′,5′-dimethylphenyl)-7-dimethylamino-carbostyril of melting point 151–153° C., 1 - ethyl-3-(3′ - chlorophenyl)-7-dimethylamino-carbostyril of melting point 161–162° C., 1-ethyl-3-phenyl-7-monoethylamino-carbostyril of melting point 178–180° C. or 1-ethyl-3-phenyl-7-N-methyl - N - ethylamino-carbostyril of melting point 75–78° C.

These compounds are obtainable in such a way that, in analogy to the method of production given in Example 1, the 2-amino-4-nitrotoluenes and phenylglyoxylic acid ethyl esters concerned are condensed with each other, the nitro-carbostyrils formed are reduced to amino-carbostyrils and these optionally alkylated.

We claim:
1. A compound of the formula

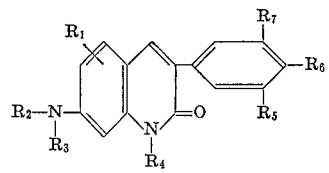

wherein $R_1$, $R_2$, $R_3$ and $R_4$ are individually defined as members selected from the group consisting of hydrogen and lower alkyl; and $R_5$, $R_6$ and $R_7$ are individually defined as members selected from the group consisting of hydrogen, linear alkyl, alkoxy and halo.

2. The compound of claim 1 wherein $R_1$ is a substituent member selected from the group consisting of hydrogen and lower alkyl, $R_1$ being attached in the 6-position of the carbostyril ring.

3. A compound of claim 1 wherein $R_2$ and $R_3$ are lower alkyl, $R_1$ is hydrogen, $R_4$ is ethyl and $R_{5-7}$ are hydrogen.

4. A compound of claim 1 wherein $R_2$ and $R_3$ are lower alkyl, $R_1$ is hydrogen, and $R_{4-7}$ are hydrogen.

5. A compound of claim 1 wherein $R_2$ and $R_3$ are lower alkyl, $R_1$ is hydrogen, $R_4$ is methyl, and $R_{5-7}$ are hydrogen.

6. A compound of claim 1 wherein $R_{1-3}$ are hydrogen, $R_4$ is lower alkyl, and $R_{5-7}$ are hydrogen.

7. A compound of claim 2 wherein $R_2$ and $R_3$ are lower alkyl, $R_1$, $R_4$ and $R_6$ are methyl, and $R_5$ and $R_7$ are hydrogen.

8. A compound of claim 1 wherein $R_2$ and $R_3$ are lower alkyl, $R_4$ is ethyl, $R_5$ is chloro and $R_1$, $R_6$, and $R_7$ are hydrogen.

References Cited

UNITED STATES PATENTS

| | | | |
|---|---|---|---|
| 3,008,969 | 11/1961 | Pretka | 260—289 X |
| 3,351,482 | 11/1967 | Raue | 252—301.2 X |
| 3,356,689 | 12/1967 | Haeberli | 252—301.2 X |
| 2,781,345 | 2/1957 | Leavitt et al. | 260—288 |
| 2,901,485 | 8/1959 | Brody et al. | 260—288 |
| 3,178,434 | 4/1965 | Pfister et al. | 260—288 |

OTHER REFERENCES

Kruse et al.: Jour. Am. Chem. Soc., vol. 76, p. 5796 (1954).

NICHOLAS S. RIZZO, *Primary Examiner.*

D. DAUS, *Assistant Examiner.*

U.S. Cl. X.R.

8—88; 106—288; 252—301.2; 260—289, 473, 577, 578

UNITED STATES PATENT OFFICE
CERTIFICATE OF CORRECTION

Patent No. 3,420,835                             January 7, 1969

Wolf-Dieter Wirth et al.

It is certified that error appears in the above identified patent and that said Letters Patent are hereby corrected as shown below:

Column 1, lines 61 to 66, the formula should appear as show below:

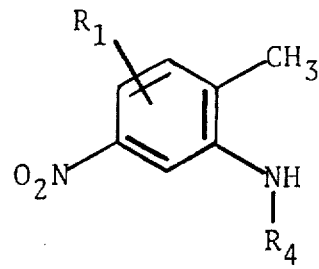

Column 2, lines 10 to 16, the formula should appear as shown below:

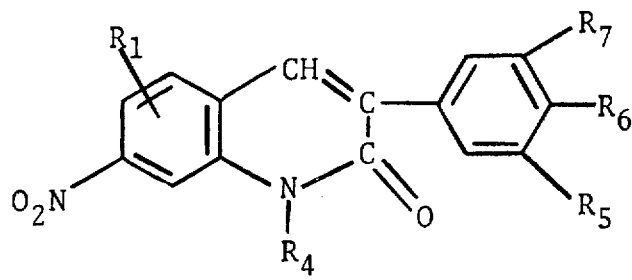

Signed and sealed this 24th day of March 1970.

(SEAL)
Attest:

EDWARD M. FLETCHER, JR.
Attesting Officer

WILLIAM E. SCHUYLER, JR.
Commissioner of Patents